(12) United States Patent
Nordbruch et al.

(10) Patent No.: US 10,546,492 B2
(45) Date of Patent: Jan. 28, 2020

(54) METHOD FOR PROVIDING VARIABLES FOR OBTAINING A SERVICE AT A SERVICE LOCATION

(71) Applicant: Robert Bosch GmbH, Stuttgart (DE)

(72) Inventors: Stefan Nordbruch, Kornwestheim (DE); Juergen Auracher, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 182 days.

(21) Appl. No.: 15/685,679

(22) Filed: Aug. 24, 2017

(65) Prior Publication Data

US 2018/0061227 A1 Mar. 1, 2018

(30) Foreign Application Priority Data

Aug. 30, 2016 (DE) .......................... 10 2016 216 275

(51) Int. Cl.
| | |
|---|---|
| *E01F 9/00* | (2016.01) |
| *G08G 1/04* | (2006.01) |
| *G01S 13/92* | (2006.01) |
| *G01S 13/93* | (2006.01) |

(52) U.S. Cl.
CPC ................ *G08G 1/04* (2013.01); *G01S 13/92* (2013.01); *G01S 2013/9385* (2013.01)

(58) Field of Classification Search
CPC .................... G01S 13/86; G01S 13/931; G01S 2013/9371; G08G 1/04; G08G 1/042; G08G 1/0116; G08G 1/00; G08G 1/14; G01C 21/00; G01C 21/3685; E04H 14/00
USPC .................................. 52/174, 741.1; 186/41
See application file for complete search history.

(56) References Cited

U.S. PATENT DOCUMENTS

| | | | | |
|---|---|---|---|---|
| 4,392,119 A | * | 7/1983 | Price ....................... | G08G 1/065 336/84 M |
| 6,386,323 B1 | * | 5/2002 | Ramachandran ....... | E04H 14/00 186/36 |
| 7,669,757 B1 | * | 3/2010 | Crews ..................... | G06Q 20/20 235/379 |
| 2006/0218057 A1 | * | 9/2006 | Fitzpatrick ............. | G06Q 10/04 705/28 |
| 2009/0255195 A1 | * | 10/2009 | Bridgman ............... | E04H 14/00 52/174 |
| 2016/0155328 A1 | * | 6/2016 | Bernal ................ | G06K 9/00785 382/104 |

(Continued)

FOREIGN PATENT DOCUMENTS

| | | |
|---|---|---|
| DE | 102011014855 A1 | 9/2012 |
| DE | 102012219924 A1 | 4/2014 |

(Continued)

*Primary Examiner* — Chi Q Nguyen
(74) *Attorney, Agent, or Firm* — Norton Rose Fulbright US LLP; Gerard Messina

(57) ABSTRACT

A method and a first device for providing variables for obtaining a service at a service location, the service location including an access lane, and at least one sensor device assigned to the access lane being provided, including a step for detecting data values with the aid of the sensor device, the data values representing variables for obtaining the service as a function of at least one part of the access lane, and including a step for providing the variables represented by the data values in such a way that the variables are made accessible to a first vehicle, which is not in the at least one part of the access lane.

11 Claims, 3 Drawing Sheets

(56) References Cited

U.S. PATENT DOCUMENTS

2018/0215395 A1* 8/2018 Keany ................ G06K 9/6267
2019/0050936 A1* 2/2019 Hachisuka ......... G01C 21/3697

FOREIGN PATENT DOCUMENTS

EP           1006503  A2    6/2000
GB           2415078  A     12/2005

* cited by examiner

METHOD FOR PROVIDING VARIABLES FOR OBTAINING A SERVICE AT A SERVICE LOCATION

CROSS REFERENCE

The present application claims the benefit under 35 U.S.C. § 119 of German Patent Application No. DE 102016216275.6 filed on Aug. 30, 2016, which is expressly incorporated herein by reference in its entirety.

FIELD

The present invention relates to a method and a first device for providing variables for obtaining a service at a service location. The present invention furthermore relates to a second device for a first vehicle for receiving variables for obtaining a service at a service location.

SUMMARY

According to the present invention, an example method for providing variables for obtaining a service at a service location is described, the service location including an access lane, and at least one sensor device assigned to the access lane being provided. The method includes a step for detecting data values with the aid of the sensor device, the data values representing variables for obtaining the service as a function of at least one part of the access lane, and a step for providing the variables represented by the data values in such a way that the variables are made accessible to a first vehicle, which is not in the at least one part of the access lane.

Within the meaning of the method according to the present invention, a first vehicle is understood to be either the vehicle itself and/or a driver of the first vehicle, in particular in relation to the display of the method-relevant variables. The vehicle may furthermore be both a manually operated vehicle and a semi- or fully-automated vehicle. In this case, the first vehicle is understood to be either the vehicle and/or, instead of the vehicle, a user of the first vehicle, to whom the method-relevant variables are displayed.

Within the meaning of the method according to the present invention, the feature that the first vehicle is not situated in the at least one part of the access lane is also understood in such a way that the variables apply to the entire access lane, and the first vehicle is situated outside the access lane, for example shortly before the entrance to the access lane.

The method according to the present invention has the advantage that, before the first vehicle is itself in the access lane of the service location or in the at least one part of the access lane, it receives information which is relevant for obtaining the service. As a result, a driver and/or a user of the first vehicle, for example, may decide at an early point whether he would like to actually use the service of the service location. This may no longer be possible at a later point in time, for example when the first vehicle is already in the access lane, since other vehicles are in the access lane in such a way that it is no longer possible to leave the access lane.

Within the meaning of the method according to the present invention, a service location may generally be understood to be a facility which, first of all, offers a service and which, secondly, is accessible by a vehicle with the aid of an access lane. It may be, for example, a gas station, a fast-food restaurant or a toll booth. A service location may furthermore be understood to be, for example, an ATM machine which may be operated directly from a vehicle.

An access lane is understood to be, for example, a single-lane road (in each direction of travel) or a multi-lane road, which enables a vehicle to access the service location directly from a street. For example, it may also be understood to be an access lane to an underground garage, a parking lot, or a parking garage, a ticket machine, for example, representing the service location in this case.

In one particularly preferred specific embodiment, the data values represent variables for obtaining the service in such a way that at least one second vehicle or no vehicle is situated in the at least one part of the access lane.

This is particularly advantageous, since knowledge as to whether second vehicles which are also using the access lane to the service location or no vehicle is/are in the access lane greatly influences the variables for obtaining a service at a service location by a first vehicle.

The variables for obtaining the service include a number of second vehicles in the at least one part of the access lane.

This is particularly advantageous, since, in particular, the number of second vehicles which are also using the access lane to the service location greatly influences the variables for obtaining a service at a service location by a first vehicle.

The variables for obtaining the service preferably include a first service time, which describes a time period for obtaining the service.

A service time within the meaning of the present invention is understood to be, for example, the time the first vehicle requires from first entering the access lane to the service location until finally leaving the service location—also via the access lane or via a (possibly) existing exit lane. Moreover, depending on the type of service location or depending on the type of service, the service time may also be understood to be the time required for actually obtaining the service without taking into account the travel time on the access lane. The service time may furthermore be understood to be a time period, which the first vehicle (presumably) requires between two locations, for example within or at the beginning of the access lane. The service time may also be understood, for example, in the sense of a waiting period, and it may thus be equal to zero if no second vehicle is in the at least one part of the access lane.

This is particularly advantageous, since the service time, in particular, represents an important indication which is relevant for the first vehicle for obtaining a service at a service location and will influence whether, for example, a driver of the first vehicle decides in favor of or against actually using the service.

The first service time is particularly preferably determined from the number of second vehicles and/or from the length of the access lane and/or from stored second service times, as a function of the number of second vehicles.

This is particularly advantageous, since the service time may be determined cost-effectively with the aid of the proposed time recording methods without using complex, additional time recording devices.

The at least one sensor device assigned to the access lane preferably includes ground sensors.

An advantage thereof is that a fast and locally precise detection of the variables for obtaining a service at a service location is facilitated with the aid of the ground sensors.

The at least one sensor device assigned to the access lane preferably includes at least one camera and/or at least one radar sensor.

This is particularly advantageous, since many different variables are detectable with the aid of a camera and/or a radar sensor. For example, an accident between two second vehicles, which certainly greatly influences the variables for obtaining a service at a service location, is directly detectable with the aid of a camera. For example, it is possible to detect the relevant variables with the aid of a radar sensor even at night and independently of solar radiation.

The at least one sensor device assigned to the access lane preferably includes at least one light barrier and/or at least one induction loop.

This is particularly advantageous, since the two methods facilitate a secure and cost-effective detection of the variables for obtaining a service at a service location.

The data values preferably represent variables for obtaining the service as a function of the at least one second vehicle in the at least one part of the access lane in such a way that the distance of the at least one second vehicle from the service station is less than the distance between the first vehicle and the service location according to predefined criteria.

A distance between a first and/or a second vehicle and the service location may be understood to be the direct distance (linear distance) as well as a predefined distance along the access lane.

This is particularly advantageous, since, in particular, the second vehicles which are ahead of the of the first vehicle—within the access lane, for example—greatly influence the variables for obtaining a service at a service location—in particular the service time.

In one particularly preferred specific embodiment, the provision of the variables represented by the data values takes place in such a way that these variables are made accessible to the first vehicle by displaying the variables with the aid of a display of the service location in such a way that the variables are detected from the first vehicle, and/or the variables are transmitted to the first vehicle from the service location, with the aid of a radio link.

The display of the variables yields the advantage that the relevant variables for obtaining a service at a service location are directly and quickly accessible. Providing the variables via a radio link yields the advantage that the variables are also transmittable over great distances between the first vehicle and the service location. For example, a driver and/or user of the first vehicle is informed thereby at a very early point as to whether the service is obtainable, for example within an acceptable time for the driver and/or user. This makes it possible for the driver and/or user of the first vehicle, for example, to seek out another service location if the variables, such as the anticipated service time, are unacceptable. The provision of the variables for obtaining a service at a service location via a radio link furthermore makes it possible to display these variables on a mobile receiving device, for example on a smart phone of a user of the first vehicle (if the latter is a semi- or fully-automated vehicle).

In one particularly preferred specific embodiment, the data values are detected in such a way that the data values are transmitted to an external processing unit for evaluation, and the evaluated data values are received by the external processing unit.

This is particularly advantageous, since an external processing unit provided specifically for this purpose may evaluate the data values particularly quickly and comprehensively. An external processing unit may also offer more comprehensive technical capabilities, for example computing and/or storage capacities, than is possible, for example, at a service location.

The first device according to the present invention for providing variables for obtaining a service at a service location, the service location including an access lane and at least one sensor device assigned to the access lane being provided, includes first means for detecting data values with the aid of the sensor device, the data values representing variables for obtaining the service as a function of at least one part of the access lane. The first device furthermore includes second means for providing the variables represented by the data values in such a way that these variables are made accessible to a first vehicle which is not in the at least one part of the access lane.

In the first device for providing variables for obtaining a service at a service location, the first means and/or the second means are preferably designed in such a way to carry out a method according to at least one of the dependent method claims.

The second device according to the present invention for a first vehicle for receiving variables for obtaining a service at a service location, the service location including an access lane and a sensor device assigned to the access lane being provided, includes receiving means for receiving variables, the variables being detected as the data values with the aid of the sensor device, and the data values representing variables for obtaining the service as a function of at least one part of the access lane.

The processing unit according to the present invention for receiving, evaluating and transmitting data values, the data values representing variables for obtaining a service at a service location, the service location including an access lane and at least one sensor device assigned to the access lane being provided, includes third means for receiving the data values which are detected with the aid of the sensor device.

The processing unit furthermore includes fourth means for evaluating the received data values and fifth means for transmitting the evaluated data values.

Advantageous refinements of the present invention are described herein.

BRIEF DESCRIPTION OF THE DRAWINGS

Exemplary embodiments of the present invention are illustrated in the figures and explained in greater detail below.

DETAILED DESCRIPTION OF EXAMPLE EMBODIMENTS

Figure 1:
FIG. 1 shows one exemplary embodiment of a first device according to the present invention for providing variables for obtaining a service at a service location.

FIG. 1 shows a first device 150, which is designed to carry out method 400 according to the present invention. First device 150 includes first means 151 for detecting data values with the aid of a sensor device 120, the data values representing variables for obtaining a service. First device 150 furthermore includes second means 152 for providing the variables represented by the data values in such a way that the variables are made accessible to a first vehicle 300.

First means 151 are designed in such a way that they are able to receive and process data values from sensor device 120. For this purpose, first means 151 include, for example, a processor, a random access memory and a hard drive. First means 151 furthermore include the software required for this purpose, which is stored, for example, on the hard drive. First means 151 are also designed to process and evaluate the data values received from sensor device 120 and to forward them to second means 152. In one embodiment variant, the data values detected by sensor device 120 are received with the aid of a direct (cable) connection. In another embodiment variant, the detected data values are received wirelessly, first means 151 being equipped with a corresponding transmitting and/or receiving unit.

The evaluation of the data values takes place with the aid of the existing software, which determines the method-relevant variables, for example the presence of second vehicles 130, 131. These variables furthermore include, for example, the number of second vehicles 130, 131 and/or the service time for obtaining the service. The data values may also include other variables, for example also as a function of the particular design of sensor device 120.

For example, the time period is determined in that the detected data values are evaluated with respect to the number of second vehicles 130, 131, and the number, which is now present in the form of a variable, is multiplied by an average service time per vehicle, which is stored, for example, as a data value on the hard drive. In another embodiment variant, the average service time per vehicle may also be detected directly by measuring service times and averaging them over a predefined number of operations and storing them as a data value on the hard drive.

In another embodiment variant, the detection of data values with the aid of the sensor device takes place in such a way that the data values are transmitted via a radio link to an external processing unit 500, for example with the aid of a transceiver unit included in first means 151, the processing unit carrying out an evaluation of the data values and transmitting the results to first and/or second means 151, 152 in the form of additional data values. The evaluation is carried out, for example, as in the description of first means 151.

Second means 152 are designed in such a way that they receive the variables provided by first means 151, for example in the form of additional data values, and prepare them in such a way that these variables are made accessible to a first vehicle 300. In one embodiment variant, the variables are made accessible in such a way that they are displayed on a display 140. Second means 152 transmit the variables to display 140 in a corresponding data format. For this purpose, second means 152 include, for example, a processor, a random access memory and a hard drive, which includes the software required for this purpose. In another embodiment variant, the variables are additionally and/or exclusively made available wirelessly. For this purpose, second means 152 include, for example, a corresponding transmitting unit.

Figure 2:
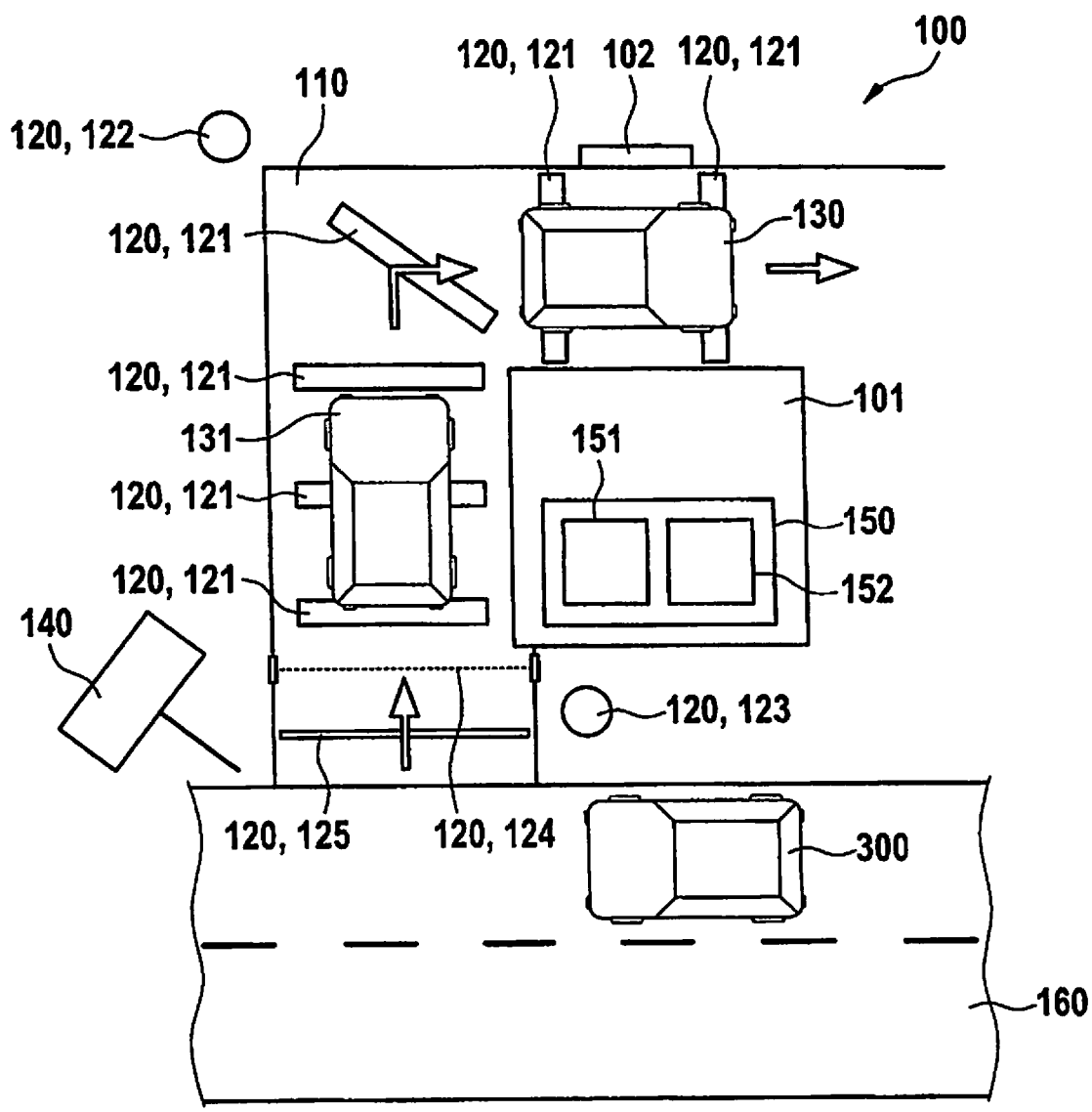
FIG. 2 shows one exemplary embodiment.

FIG. 2 shows a schematic representation of a service location 100, purely by way of example, which includes a building 101 as well as an access lane 110. Access lane 110 leads from a street 160 along the illustrated arrow to a service receiving station 102. The latter may be, for example, an intercom or a ticket machine.

Service location 100 furthermore includes a sensor device 120, which includes, for example in this case, ground sensors 121, a camera 122, a radar sensor 123, a light barrier 124 and an induction loop 125. Additional sensors, such as LIDAR sensors and/or ultrasonic sensors, may also be included. Sensor device 120 may furthermore include only one sensor or an arbitrary combination of the aforementioned sensors. Multiple sensors of the same type, for example a camera, may also be included, which detect different parts of access lane 110.

In another specific embodiment, sensor device 120 is designed in such a way that ground sensors 121 are situated in the ground of access lane 110 along the direction of travel at a predefined distance of, for example, 1 meter. In another specific embodiment, regularly repeating light barriers 124 and/or induction loops 125 are included in sensor device 120.

Service location 100 furthermore includes a first device 150, which is designed to carry out method 400 according to the present invention and which includes first means 151 and second means 152 for this purpose. First device 150 is provided, purely by way of example, in building 101 included in service location 100. In another embodiment variant, first device 150 is directly included in service receiving station 102.

Service location 100 furthermore includes a display 140, which is designed to display the variables for obtaining a service at service location 100 to a vehicle 300. Display 140 here is mounted at the beginning of access lane 100 [sic; 110]. In another embodiment variant, display 140 may also be situated outside service location 100 (in the vicinity thereof) or—depending on the design of service location 100 and/or depending on the arrangement of the facilities of service location 100—also within service location 100, for example within access lane 110. Display 140 is designed, for example, as a monitor. In another embodiment variant, display 140 is designed as a digital display panel.

In the exemplary embodiment illustrated here, two second vehicles 130, 131 are in access lane 110 of service location 100. First vehicle 300 is situated before the beginning of access lane 110. One of the two second vehicles 131 is in visual range of a driver of first vehicle 300. Viewed from first vehicle 300, other second vehicle 130 is behind building 101 of service location 100 and thus out of visual range of a driver of first vehicle 300. The two second vehicles 130, 131 are detected with the aid of sensor device 120, for example with the aid of ground sensors 121 in this case, and the corresponding data values are transmitted to first means 151 of first device 150. First means 151 evaluate the detected data values and transfer the relevant variables for obtaining a service at service location 100 to second means 152. The variables include the fact, for example, that two second vehicles 130, 131 are already in access lane 110, and a waiting time for first vehicle 300 is associated therewith, which corresponds to twice the average service time per vehicle. These variables are provided with the aid of second means 152 in such a way that they are displayed to a driver of first vehicle 300 with the aid of display 140. Display 140 thus provides the driver with information which is not accessible without entering access lane 110.

Figure 3:
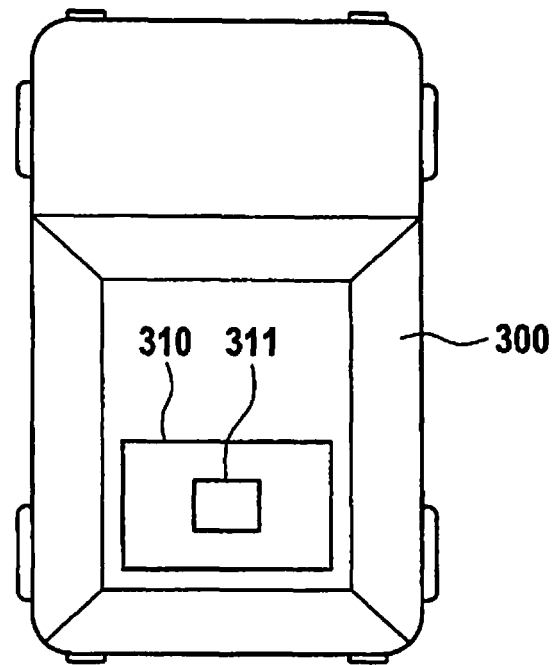
FIG. 3 shows one exemplary embodiment of a second device according to the present invention for a first vehicle for receiving variables for obtaining a service at a service location.

FIG. 3 shows a second device 310 for a first vehicle 300 for receiving variables for obtaining a service at a service location 100. Second device 310 includes receiving means 311 for receiving the variables transmitted from second means 152 of first device 150 via a radio link. Receiving means 311 are designed in such a way that the variables are received, for example, with the aid of a transmitting and/or receiving unit and are evaluated with the aid of an processing unit, which includes a processor, a random access memory and a hard disk. In another embodiment variant, receiving means 311 are designed in such a way that they forward the received variables to a mobile receiving unit, for example a smart phone of the driver of first vehicle 300, in such a way that the variables may be displayed there. In another specific embodiment, receiving means 311 are designed in such a way that the received variables are forwarded to a visual and/or acoustic output unit in first vehicle 300, for example a navigation device.

Figure 4:
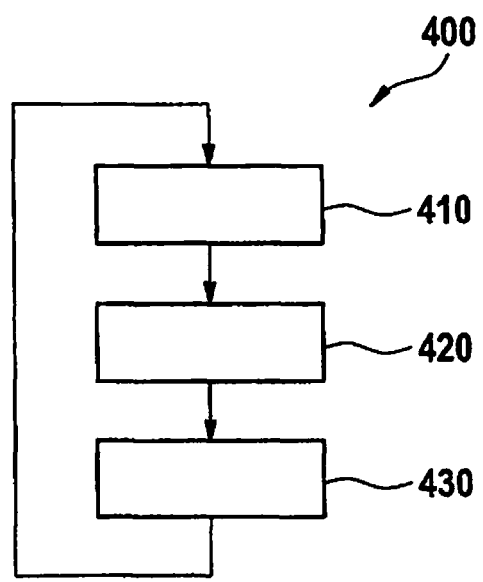
FIG. 4 shows one exemplary embodiment of the method according to the present invention in the form of a first flow chart.

FIG. 4 shows one exemplary embodiment in the form of a first flow chart. The sequence of method 400 is shown here as an infinite loop. In another specific embodiment, method 400 starts in that a first vehicle 300 approaches service location 100 in such a way that a predefined minimum distance is not reached. In another embodiment variant, method 400 starts, for example, in that a driver and/or user of first vehicle 300 informs service location 100 that a service of service location 100 is being requested. This may take place, for example with the aid of an inquiry over the Internet and/or by placing a call and/or by sending a text message, such as an SMS text.

In step 410, first means 151 detect data values with the aid of sensor device 120 of service location 100, which represent variables for obtaining a service at the service location and transmit these data values to second means 152.

In step 420, second means 152 provide the data values in such a way that the data values are made accessible to a first vehicle 300.

In step 430, the data values are displayed to a driver of first vehicle 300 on a display 140.

Figure 5:
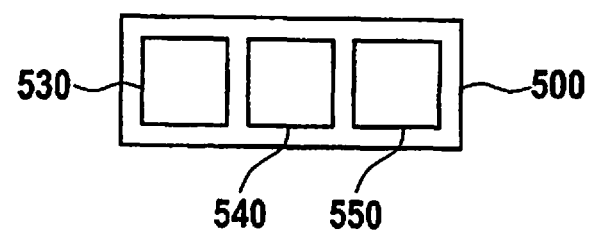
FIG. 5 shows an external processing unit for receiving, evaluating and transmitting data values.

FIG. 5 shows an external processing unit 500 for receiving, evaluating and transmitting data values, the data values representing variables for obtaining a service at a service location 100, service location 100 including an access lane 110, and at least one sensor device 120 assigned to access lane 110 being provided. External processing unit 500 includes third means 530 for receiving the data values which are detected with the aid of sensor device 120, fourth means 540 for evaluating the received data values and fifth means 550 for transmitting the evaluated data values.

Third means 530 are designed in such a way that they are able to receive the data values from first means 151 and forward them to fourth means 540.

Fourth means 540 are designed to evaluate the received data values. For this purpose, fourth means 540 include, for example, a processor, a random access memory and a hard drive. Fourth means 540 furthermore include the software required for this purpose, which is stored, for example, on the hard drive. The evaluation of the data values takes place with the aid of the existing software, which determines the method-relevant variables, for example the presence of second vehicles 130, 131. These variables furthermore include, for example, the number of second vehicles 130, 131 and/or the service time for obtaining the service. The data values may also include other variables, for example also depending on the particular design of sensor device 120. The determined variables are transmitted to fifth means 550, for example in the form of additional data values.

Fifth means 550 are designed in such a way that the evaluated data values or the determined variables are transmitted to first and/or second means 151, 152, for example in the form of additional data values. In another embodiment variant, third means 530 and fifth means 550 are designed as a transceiver unit, which is connected to fourth means 540.

Figure 6:
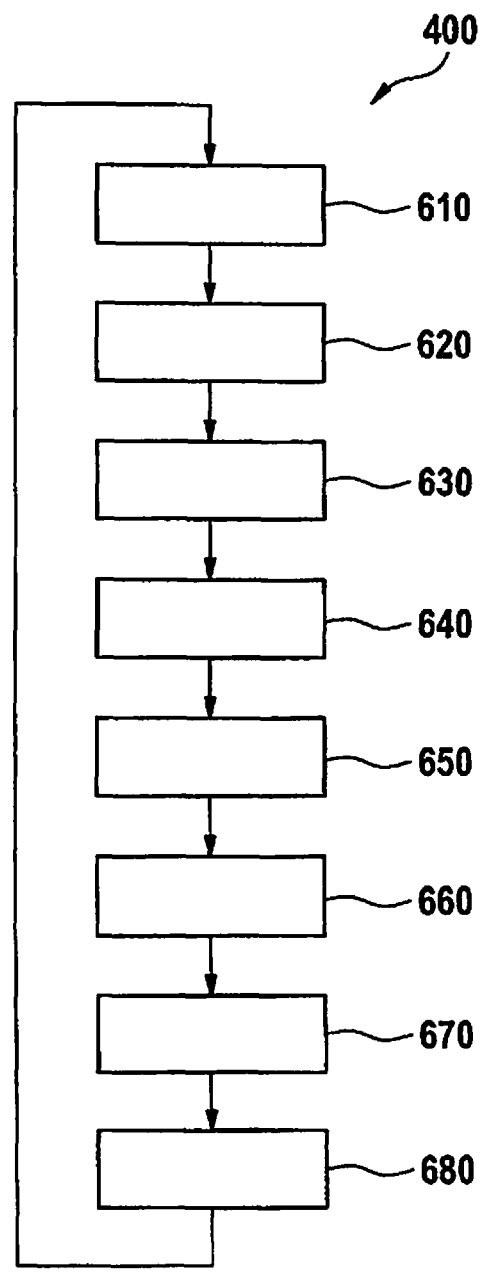
FIG. 6 shows one exemplary embodiment of the method according to the present invention in the form of a second flow chart.

FIG. 6 shows one exemplary embodiment in the form of a second flow chart. The sequence of method 400 is shown here as an infinite loop.

In step 610, first means 151 detect data values with the aid of sensor device 120 of a service location 100, which represent variables for obtaining a service at service location 100, as a function of at least one part of an access lane 110 of service location 100.

In step 620, first means 151 transmit the data values to an external processing unit 500 with the aid of a transceiver device. This takes place, for example, with the aid of a radio link.

In step 630, external processing unit 500 receives the data values transmitted from first means 151 with the aid of third means 530 and forwards them to fourth means 540.

In step 640, the data values are evaluated with the aid of fourth means 540. The variables which are relevant for obtaining a service at a service location 100 are extracted from the data values, for example with the aid of suitable evaluation methods, and forwarded to fifth means 550, stored in the form of additional data values.

In step 650, the additional data values, which now represent the variables for obtaining a service at a service location 100 as a function of the at least one part of access lane 110 of the service location, are transmitted to first means 151 with the aid of fifth means 550.

In step 660, the additional data values are transmitted to second means 152.

In step 670, second means 152 provide the data values in such a way that they may be accessed from a mobile unit, for example a smart phone, in a first vehicle 300.

In step 680, the variables represented by the additional data values are displayed on the mobile unit, for example to an operator of first vehicle 300.

What is claimed is:

1. A method for providing variables for obtaining a service at a service location, the service location including an access lane, and at least one sensor device assigned to the access lane, the method comprising:
    detecting data values by the at least one sensor device, the data values representing variables for obtaining the service as a function of at least one part of the access lane; and
    providing the variables represented by the data values in such a way that the variables are made accessible to a first vehicle which is not in the at least one part of the access lane.

2. The method as recited in claim 1, wherein the data values represent the variables in such a way that at least one second vehicle or no additional vehicle is situated in the at least one part of the access lane.

3. The method as recited in claim 2, wherein the variables for obtaining the service include a number of second vehicles in the at least one part of the access lane.

4. The method as recited in claim 3, wherein the variables for obtaining the service include a first service time, which describes a time period for obtaining the service.

5. The method as recited in claim 4, wherein the first service time is determined from at least one of: (i) the number of second vehicles, (ii) a length of the access lane, and (iii) stored second service times, as a function of the number of second vehicles.

6. The method as recited in claim 2, wherein the data values represent variables for obtaining the service as a function of the at least one second vehicle in the at least one part of the access lane in such a way that a distance of the at least one second vehicle from the service station is less than a distance between the first vehicle and the service location according to predefined criteria.

7. The method as recited in claim 1, wherein the at least one sensor device assigned to the access lane includes ground sensors.

8. The method as recited in claim 1, wherein the at least one sensor device assigned to the access lane includes at least one of: (i) at least one camera, and (ii) at least one radar sensor.

9. The method as recited in claim 1, wherein the at least one sensor device assigned to the access lane includes at least one of: (i) at least one light barrier, and (ii) at least one induction loop.

10. The method as recited in claim 1, wherein the providing of the variables represented by the data values takes place in such a way that the variables are made accessible to the first vehicle by at least one of: (i) displaying the variables by a display of the service location in such a way that the variables are detected from the first vehicle, and (ii) transmitting the variables to the first vehicle from the service location via a radio link.

11. The method as recited in claim 1, wherein the data values are detected in such a way that the data values are transmitted to an external processing unit for evaluation.

* * * * *